(12) United States Patent
Upadhyay et al.

(10) Patent No.: US 8,639,277 B1
(45) Date of Patent: *Jan. 28, 2014

(54) METHODS AND SYSTEMS FOR AUTOMATICALLY FORWARDING DATA MESSAGES IN A WIRELESS TELECOMMUNICATIONS NETWORK

(71) Applicant: Sprint Communications Company L.P., Overland Park, KS (US)

(72) Inventors: Piyush Upadhyay, Overland Park, KS (US); John Schuler, Overland Park, KS (US); William J. Routt, Danville, CA (US); Jamie Kennedy, Olathe, KS (US); Rodney D. Nelson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/758,355

(22) Filed: Feb. 4, 2013

Related U.S. Application Data

(63) Continuation of application No. 13/458,641, filed on Apr. 27, 2012, now Pat. No. 8,369,879, which is a continuation of application No. 12/252,873, filed on Oct. 16, 2008, now Pat. No. 8,195,169.

(51) Int. Cl.
*H04W 4/00* (2009.01)
(52) U.S. Cl.
USPC .......................................................... 455/466
(58) Field of Classification Search
USPC ........... 455/445, 466, 187.1, 414.1, 406, 405; 370/338, 316, 238, 313
See application file for complete search history.

(56) References Cited

U.S. PATENT DOCUMENTS

2005/0170837 A1* 8/2005 Halsell ........................ 455/445
2008/0293389 A1* 11/2008 Chin et al. .................. 455/414.1

* cited by examiner

*Primary Examiner* — Kiet Doan

(57) ABSTRACT

A data message originally addressed to a first mobile device is forwarded to a second mobile device in a wireless telecommunications network. Data messages may include text messages, picture messages, and video messages. In addition to forwarding data messages, other optional data message forwarding features are provided such as a copy feature that allows for a forwarded message to be copied back to the original addressee, and an invisible feature that prevents a data message sender from knowing that a data message has been forwarded by the data message addressee.

15 Claims, 6 Drawing Sheets

METHODS AND SYSTEMS FOR AUTOMATICALLY FORWARDING DATA MESSAGES IN A WIRELESS TELECOMMUNICATIONS NETWORK

CROSS-REFERENCE TO RELATED APPLICATIONS

This application is a continuation of U.S. patent application Ser. No. 13/458,641, filed Apr. 27, 2012, entitled "Methods And Systems For Automatically Forwarding Data Messages In A Wireless Telecommunications Network," which is a continuation of prior U.S. patent application Ser. No. 12/252,873, filed Oct. 16, 2008, now U.S. Pat. No. 8,195,169, entitled "Methods And Systems For Automatically Forwarding Data Messages In A Wireless Telecommunications Network", the entirety of which is incorporated herein by reference.

SUMMARY

Embodiments of the invention are defined by the claims below, not this summary. A high-level overview of embodiments of the invention is provided here for that reason, to provide an overview of the disclosure.

In a first aspect, computer-readable media having embodied thereon computer-useable instructions provide a method of forwarding a data message, originally addressed to a first mobile device, to a second mobile device in a wireless telecommunications network, where the data message is sent from a third mobile device. The method includes receiving the data message originally addressed to the first mobile device and sent from the third mobile device. A determination is made that the data message is to be forwarded to the second mobile device. Routing information is determined for sending the data message to the second mobile device, where determining the routing information includes referencing a local database that contains routing information. The data message is forwarded to the second mobile device. A determination is made as to whether the data message originally addressed to the first mobile device, and forwarded to the second mobile device, should also be sent to the first mobile device in addition to forwarding the data message to the second mobile device. When a determination is made that the data message should also be sent to the first mobile device, then the data message is sent to the first mobile device in addition to forwarding the data message to the second mobile device, where the data message sent from the third mobile device is sent to both the second mobile device and the first mobile device.

In a second aspect, computer-readable media having embodied thereon computer-useable instructions provide a method of forwarding a data message originally addressed to a first mobile device to a second mobile device in a wireless telecommunications network. The method includes receiving a data message from a third mobile device addressed to the first mobile device. A determination is made that the data message is to be forwarded to the second mobile device, where the determining includes referencing a local database. Routing information is determined for sending the data message to the second mobile device, where determining the routing information includes referencing the local database. The data message is forwarded to the second mobile device. An indication of unavailability associated with the forwarding of the data message to the second mobile device is received, where the indication of unavailability is addressed to the third mobile device, and where the indication indicates that the second mobile device is unavailable. A determination is made that the forwarding is to be invisible to the third mobile device, where the forwarding is invisible when the third mobile device is prevented from receiving an indication that the data message has been forwarded. The indication of unavailability is not forwarded to the third mobile device based on the determination that the forwarding is to be invisible, wherein the third mobile device is prevented from knowing that the data message has been forwarded.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
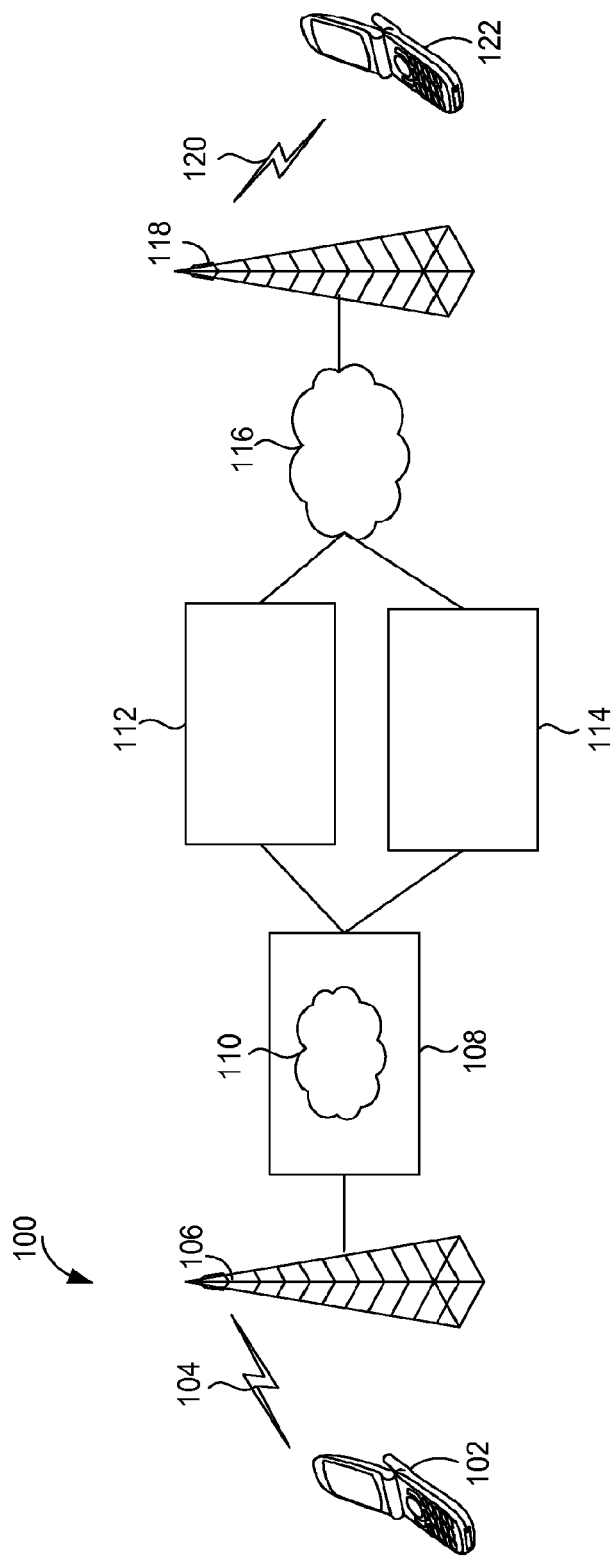
FIG. 1 depicts an operating environment suitable for implementing embodiments of the present invention.

Embodiments of the present invention provide systems and computer-readable media performing methods for forwarding a data message originally addressed to first mobile device to a second mobile device in a wireless telecommunications network. In addition to forwarding data messages, other optional data message forwarding features are provided such as a copy feature that allows for a forwarded message to be copied back to the original addressee, and an invisible feature that prevents a data message sender from knowing that a data message has been forwarded.

Throughout the description of the present invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| 3G | Third Generation |
| CDMA | Code Division Multiple Access |
| GSM | Global System for Mobile-Communications |
| HLR | Home Location Register |
| IC | Inter-carrier |
| LAN | Local Area Network |

| | |
|---|---|
| MT - SMSC | Mobile Terminating - Short Message Service Center |
| PDA | Portable Digital Assistant |
| PSTN | Public-Switched Telephone Network |
| RAN | Radio Access Network |
| SMS | Short Message Service |
| TDMA | Time Division Multiple Access |
| VLR | Visitor Location Register |
| WAN | Wide Area Network |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Referring to the drawings in general, and initially to FIG. 1 in particular, an exemplary operating environment suitable for implementing embodiments of the present invention is shown and designated generally as a wireless telecommunications environment 100. Wireless telecommunications environment 100 is but one example of a suitable computing environment and is not intended to suggest any limitation as to the scope of use or functionality of the invention. Neither should the wireless telecommunications environment 100 be interpreted as having any dependency or requirement relating to any one or combination of components illustrated.

With continued reference to FIG. 1 the wireless telecommunications environment 100 contains a first mobile device 102, which is in communication 104 with a first base station 106. The first base station is connected to a data router 108 that contains computer-readable media 110. In one embodiment, the data router is a Short Message Service (SMS) router. The data router is in turn connected to a switch 112, which may be a mobile terminating short message service center (MT-SMSC) and an inter-carrier (IC) gateway 114. The switch and IC gateway are connected to a network 116 that is connected to a second base station 118. The second base station is in communication 120 with a second mobile device 122.

Base stations 106 and 118 are fixed stations used for communicating with the first and second mobile devices 102 and 122, respectively. Standard air interface protocols, such as code division multiple access ("CDMA"), global system for mobile-communications ("GSM"), or time division multiple access ("TDMA"), as well as others, may be used by each base station to communicate with each mobile device. Other network communication interface arrangements are also possible. A base station controller (not shown) is responsible for handling traffic and signaling with the mobile devices. Each base station is shown without their many components, for the sake of clarity. Each mobile device could be in simultaneous communication with multiple base stations.

First mobile device 102 could be a cell phone, a PDA, a computer, a laptop computer, or some other communications device, capable of communicating wirelessly via a radio access network (RAN) in a licensed spectrum using a format, such as CDMA, TDMA, GSM, 3G, or other acceptable format. In general, the first mobile device includes a user interface, a wireless communications interface, a processor, and a data storage component in one embodiment. The user interface may include buttons, a touch screen, a microprocessor, or other elements. The wireless communication interface may comprise an antenna and a chipset for communicating with one or more access nodes over an air interface. For instance, the chipset could be suitable for engaging in SMS communications. The chipset or wireless communication interface, in general, may be able to communicate with a CDMA network, a GSM network, or one or more additional types of wireless networks. The processor and data storage component may be any suitable component known to those of skill in the art.

The network 116 may include one or more wide area networks (WANs) and/or one or more local area networks (LANs), as well as one or more public networks, such as the Internet, and/or one or more private networks. For instance, the network may include one or more networks providing network services, such as those discussed herein. Packets may be routed in and among the network using protocols, such as the Internet Protocol (IP), and devices in communication within and among the network may be identified by a network address, such as an IP address. Furthermore, the network may include a number of circuit-switched networks, such as the public-switched telephone network (PSTN), for example.

The second mobile device 122 is any communication device capable of receiving data messages. Data messages could include text messages, picture messages, video messages, or the like. Examples of such a communications device may include a PDA, cell phone, smart phone, and personal computer.

In one embodiment, if a user operating the first mobile device 102 wishes to enable forwarding of all data messages to the second mobile device 122, the user may send an indication containing the appropriate forwarding information. The appropriate forwarding information may include the forwarding number and indications regarding the usage of any optional data message forwarding features that may be available. In one embodiment, such an indication is contained in a SMS short code. When the indication is received by the first base station 106, it is sent to the data message router 108, which stores the information contained in the indication in a local data storage component (not shown). When the data message router 108 receives a data message addressed to the first mobile device 102, it checks its local data storage component to determine if the message should be forwarded, and if so, it also determines the routing information for the location to which the data message should be forwarded. Once this is determined, the data message router 108 then determines if the forwarding number belongs to the same carrier. If the forwarding number does belong to the same carrier, then the data message router 108 sends the message to the switch 112 for delivery. However, if the forwarding number does not belong to the same carrier, then the data message router 108 sends the message to an inter-carrier gateway 114 for delivery.

If a user operating the first mobile device 102 wishes to turn off data message forwarding, the user need only send an indication, via a short code for example, of that desire. Once the data message router 108 receives this indication, the appropriate changes are made in the local data storage component.

Figure 2:
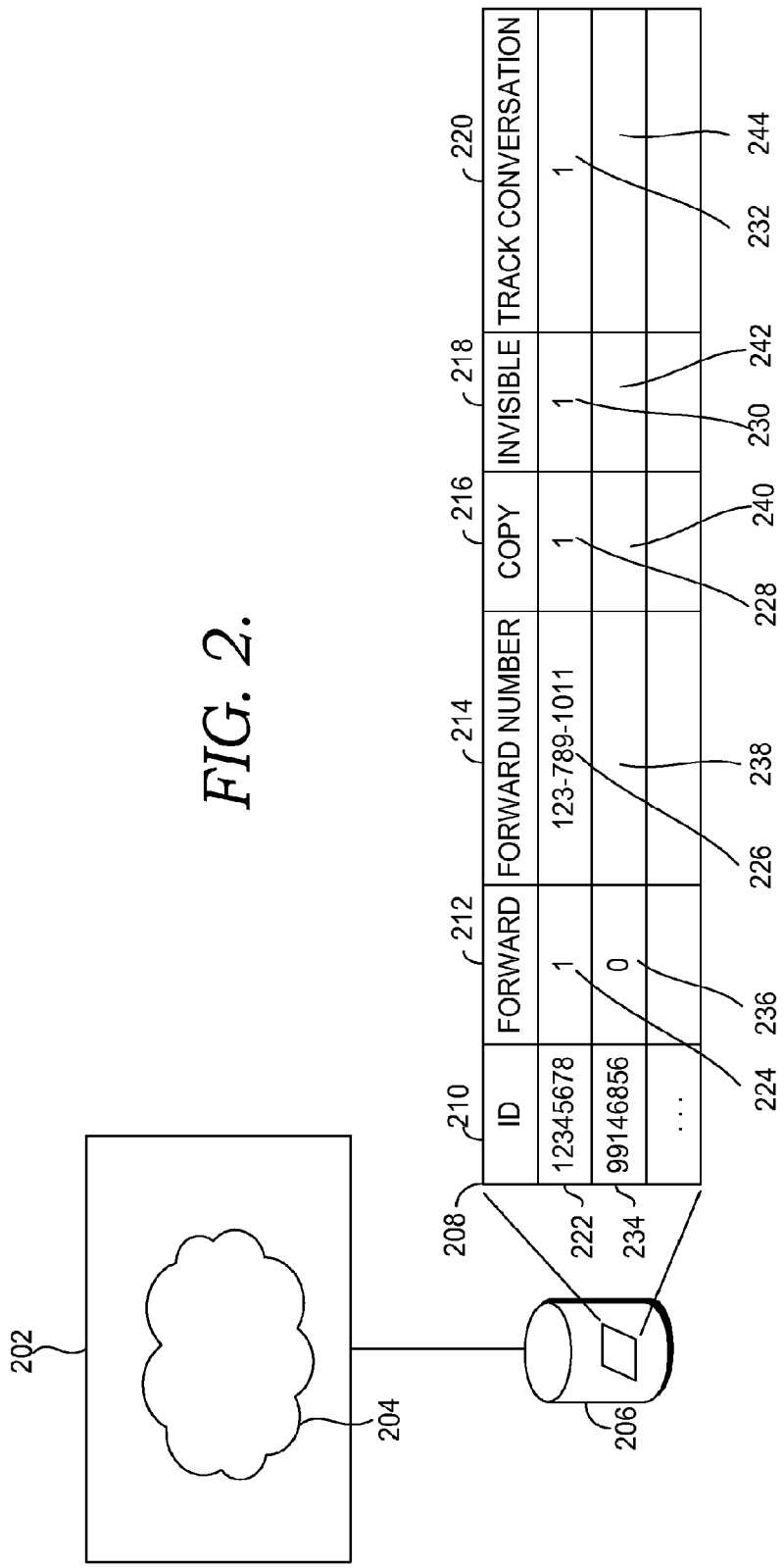
FIG. 2 depicts a more detailed view of components present within an operating environment suitable for implementing embodiments of the present invention.

FIG. 2 displays the data message router 202 of an embodiment of the present invention in greater detail. Data message router 202 has computer readable media 204 containing instructions for performing functions described herein and is attached to a data storage component 206. The data storage component 206 stores data message forwarding information, data message routing information, and any other data that may be needed by the data router during operation. In one embodiment, the data storage component 206 contains a table 208, which is used for storing information regarding the forwarding of data messages. The "ID" column 210 stores the unique identifiers for the mobile devices from which data messages are being forwarded. The "Forward" column 212 stores an indication of whether or not the data messages addressed to the mobile device identified in the "ID" column are to be forwarded to another location. This indication could be given in a variety of ways. In this embodiment, a value of "1" indicates that data messages are to be forwarded and a value of "0" indicates that data messages are not to be forwarded. In other embodiments this may be indicated using a values of "true" and "false", "yes" and "no", or the like. The "Forwarding Number" column 214 stores the number that data messages are to be forwarded to. Formatted or unformatted phone numbers may be stored in this column. In an alternate embodiment, a unique identifier for the mobile device that the data messages are to be forwarded to may be stored.

As previously mentioned, optional data message forwarding features may be enabled. One such optional feature is the copy feature, which when enabled, sends a copy of the forwarded message to the original addressee. The "Copy" column 216 gives an indication of whether or not the copy feature is enabled. This indication could be given in a variety of ways. In this embodiment, a value of "1" indicates that the feature is enabled and a value of "0" indicates the feature is not enabled. In other embodiments this may be indicated using a values of "true" and "false", "yes" and "no", or the like. In cases where data messages are not to be forwarded, these fields may be left blank.

Another optional feature is the invisible feature, which when enabled prevents the sender of a data message from finding out that the data message was forwarded. The invisible column 218 provides an indication as to whether the invisible feature is enabled. If this feature is enabled, the fact that the data message was forwarded from the original addressee to a different number will never be revealed to the message sender. This feature is mostly utilized when the forwarding destination becomes unavailable, and instead of the message sender receiving an undelivered indication from the number that the message was forwarded to, the data message router 202 determines that the forwarding is to remain invisible and will not provide this undelivered indication to the data message sender. The track conversation column 220 may be used to facilitate the invisible feature and its use is illustrated in the following example.

For example, assume that the first mobile device 102 from FIG. 1 set up data message forwarding such that all data messages addressed to it are to be forwarded to the second mobile device 122. Also assume that the user of the first mobile device 102 enabled the copy and invisible features. To achieve this, the data router saves the unique identifier for the first mobile device 102 in the in field 222, an indication that data messages should be forwarded in field 224, the forwarding number in field 226, an indication the copy feature is enabled in field 228, and an indication that the invisible feature is enabled in field 230. When a data message is sent to the first mobile device 102, the data message router 202 determines that the message should be forwarded to the second mobile device 122 and that the conversation between the second mobile device 122 and the sender of the data message should be tracked due to the invisible flag being set in field 232. To indicate that the conversation is tracked, a value of '1' is entered into field 232. In this embodiment, a value of "1" indicates that the conversation is to be tracked and a value of "0" indicates conversation is not to be tracked. In other embodiments this may be indicated using values of "true" and "false", "yes" and "no", or the like. In cases where data messages are not to be forwarded or if the invisible feature is not enabled, these fields may be left blank.

Returning to the example, assume that the second mobile device 122 is unavailable and has set up an auto-reply message. When the second mobile device 122 receives the forwarded message, it automatically sends an auto-reply message to the data message sender. When the data message router 202 receives the auto-reply message, it determines that the auto-reply message corresponds to a conversation that was being tracked, and it determines that the auto-reply message is an auto-reply via an auto-reply indicator. Since the invisible feature is enabled, the auto-reply message is not sent to the original message sender. In one embodiment, the auto reply is discarded and in another embodiment, the auto-reply message is sent to the first mobile device 102. Note that the conversation needs to be tracked so that if the user of the second mobile device 122 wished to respond to the data message not via an auto-reply message, that this message would not be discarded.

If data message forwarding is not set up, then only the identifier field and forward indication field need have any data. Referring back to the previous example, assume that field 234 is a unique identifier for the second mobile device 122 from FIG. 1, and data message forwarding has not been enabled. Therefore, field 236 has a value of '0' and the other fields 238, 240, 242, and 244 are not applicable and therefore left blank.

Figure 3:
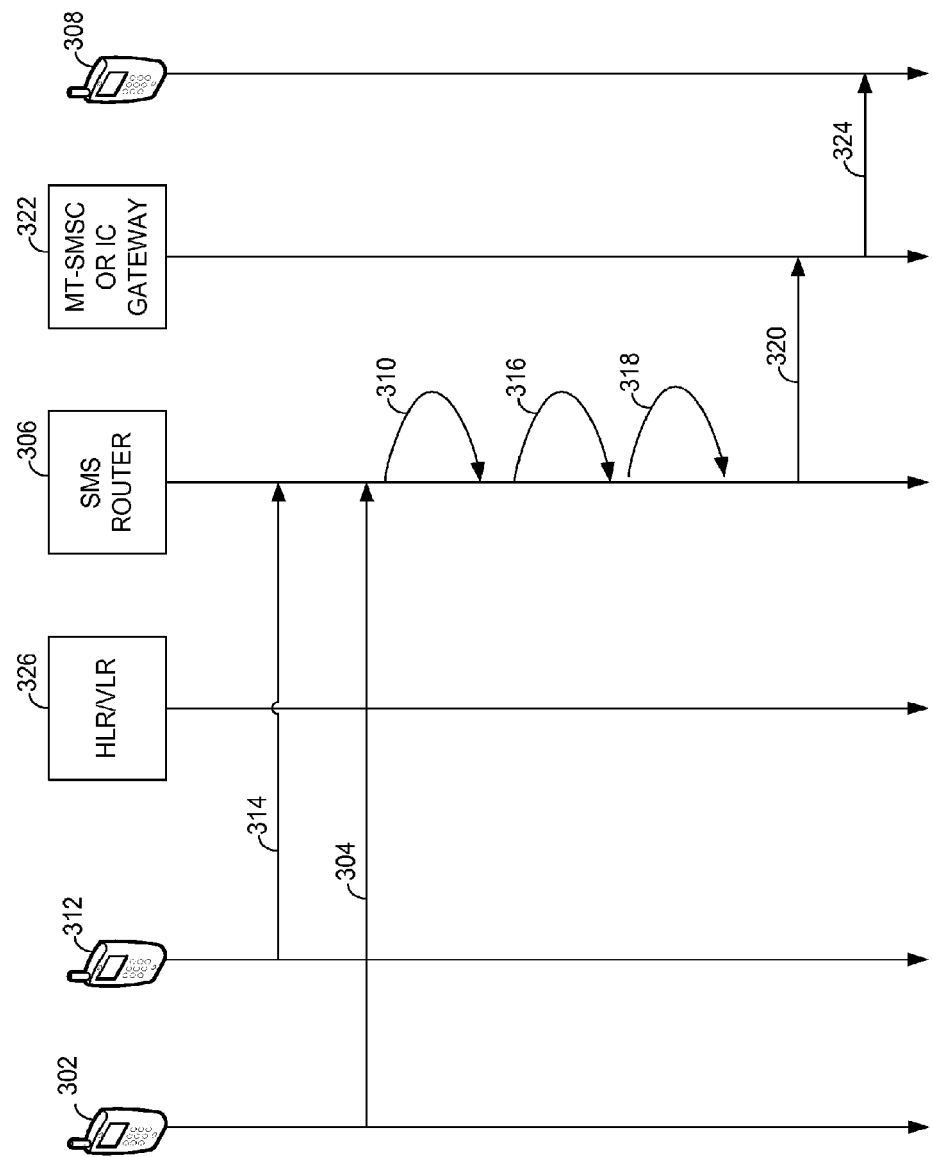
FIG. 3 depicts a diagram displaying a method to be performed by components of an embodiment of the present invention.

FIG. 3 is a diagram displaying a method for forwarding a data message to be performed by components of an embodiment of the present invention. The method begins when a first mobile device 302 sends an indication 304 to a data message router 306. The indication indicates that data messages addressed to the first mobile device should be sent to a second mobile device 308. Additional data may also be included in the indication, as discussed in the previous example. As previously mentioned, in one embodiment this indication may be a short code.

The data message router 306 stores this data in its data storage component at 310. When a third mobile device 312 sends a data message addressed to the first mobile device 302, the data message router 306 receives this message 314. The data message router 306 then determines at 316 that the message is to be forwarded to the second mobile device 308, and it determines at 318 the routing information needed to direct the data message to the second mobile device 308. This routing information may include determining if the second mobile device 308 belongs to the same carrier. Once this information is determined at 320, the data message is sent to a switching center if the second mobile device 308 belongs to the same carrier or to an inter-carrier gateway if the second mobile device 308 belongs to another carrier. From there, the message is delivered at 324 to the second mobile device 308. Note that the data message router 306 does not rely on the HLR/VLR 326, which is a component in wireless telecommunications networks typically used to determine routing information, at any point, thereby reducing the data traffic across network elements and increasing efficiency.

Figure 4:
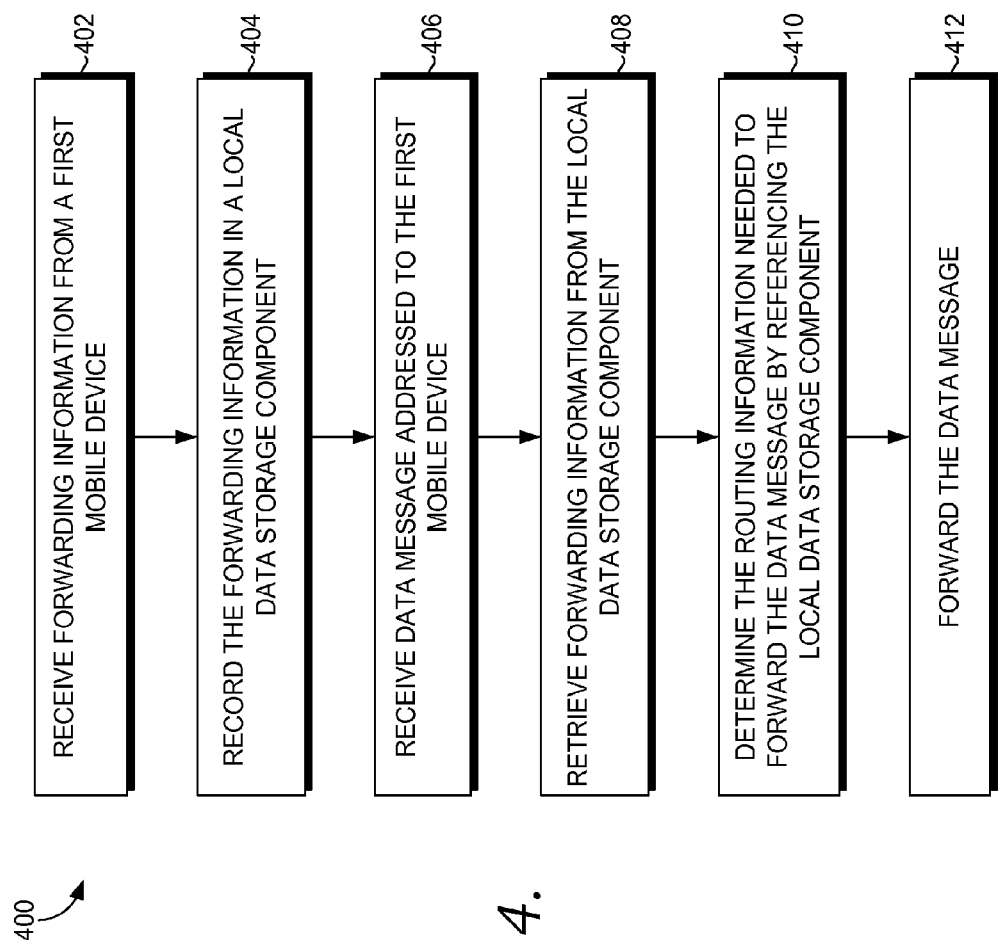
FIG. 4 is a flow chart depicting a method for forwarding a data message originally addressed to first mobile device to a second mobile device in a wireless telecommunications network to be executed on a data message router.

FIG. 4 is a flow chart depicting a method 400, executed on a data message router, for forwarding a data message originally addressed to a first mobile device to a second mobile device in a wireless telecommunications network. The method 400 begins when forwarding information is received from a first mobile device (402). This forwarding information includes the destination to which data messages are to be forwarded and other options such as if copy or invisible features, which were discussed previously, are to be enabled. This information is then stored in a local data storage component (404). When the data message router receives a data message addressed to the first mobile device (406), it retrieves this forwarding information from the local data storage component (408). Once the forwarding information is retrieved, the routing information needed to forward the data message to the forwarding number is determined by again referencing the local data storage component (410). Using this routing information, the data message is forwarded to the appropriate location (412).

Figure 5:
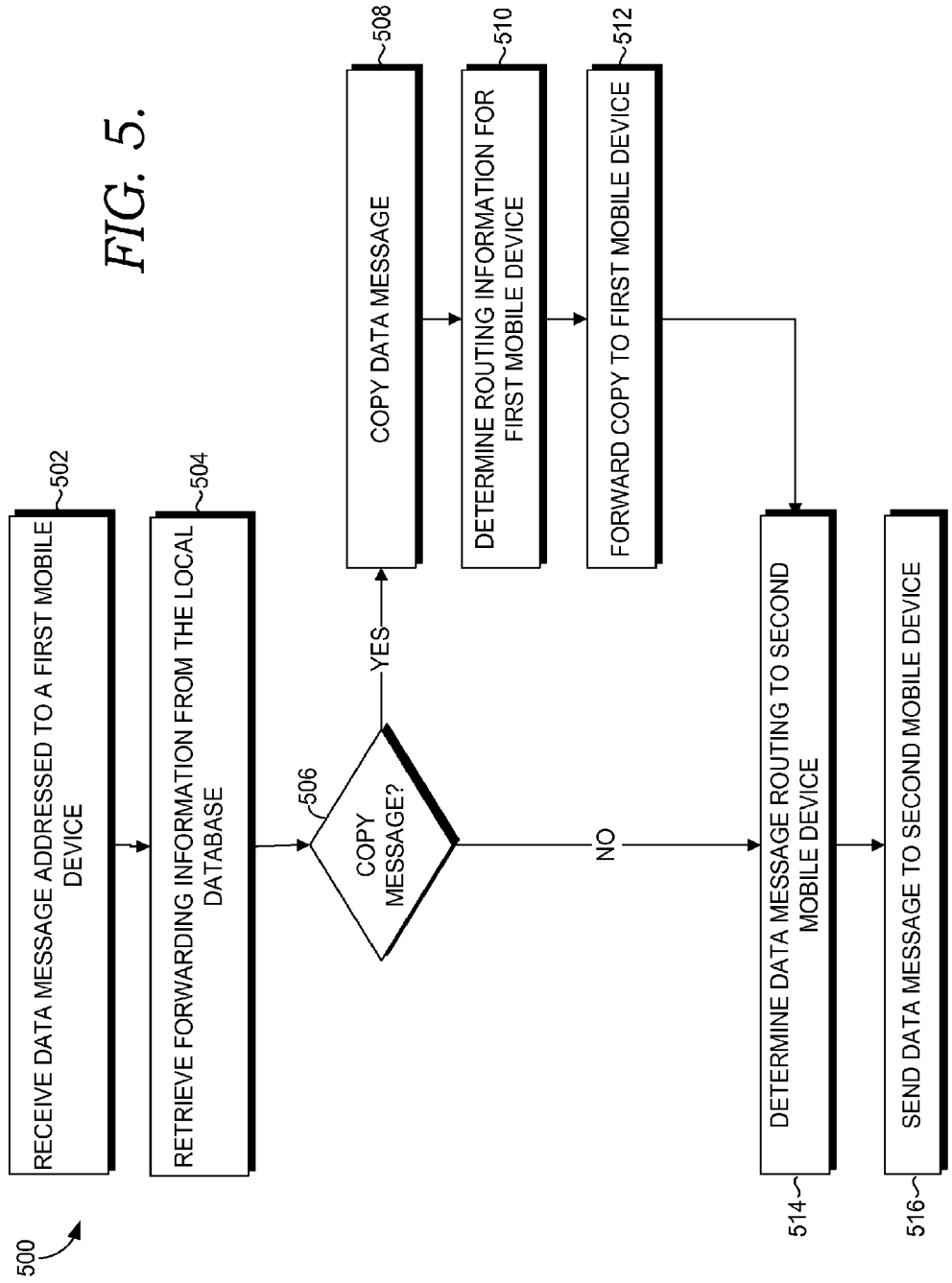
FIG. 5 is a flow chart depicting a method for forwarding a data message originally addressed to first mobile device to a second mobile device in a wireless telecommunications network to be executed on a data message router.

FIG. 5 is a flow chart depicting a method 500, executed on a data message router, for forwarding a data message originally addressed to first mobile device to a second mobile device in a wireless telecommunications network. The method 500 is performed by the data message router described in previous figures and gives a more detailed process for handling data messages to be forwarded that are also to be copied to the original addressee. In block 502, the data message router receives a data message addressed to a first mobile device. Referencing forwarding information stored in the router's local data storage component (504), the data message router determines if the data message is to be copied to the first mobile device (506). If the message is to be forwarded, then the router copies the data message (508), and determines the routing information needed for sending the copied data message to the first mobile device (510). This again is accomplished by referencing routing data stored in the local data storage component. Once the routing information is determined, the data message router forwards the data message copy to the switching center for delivery to the first mobile device (512) and progresses to block 514.

Returning to decision block 506, if the data message is not to be copied to the first mobile device, then the router determines the routing information for forwarding the data message to a second mobile device (514). The data message and forwarding information are then sent to either a switch or inter-carrier gateway for delivery to the second mobile device (516).

Figure 6:
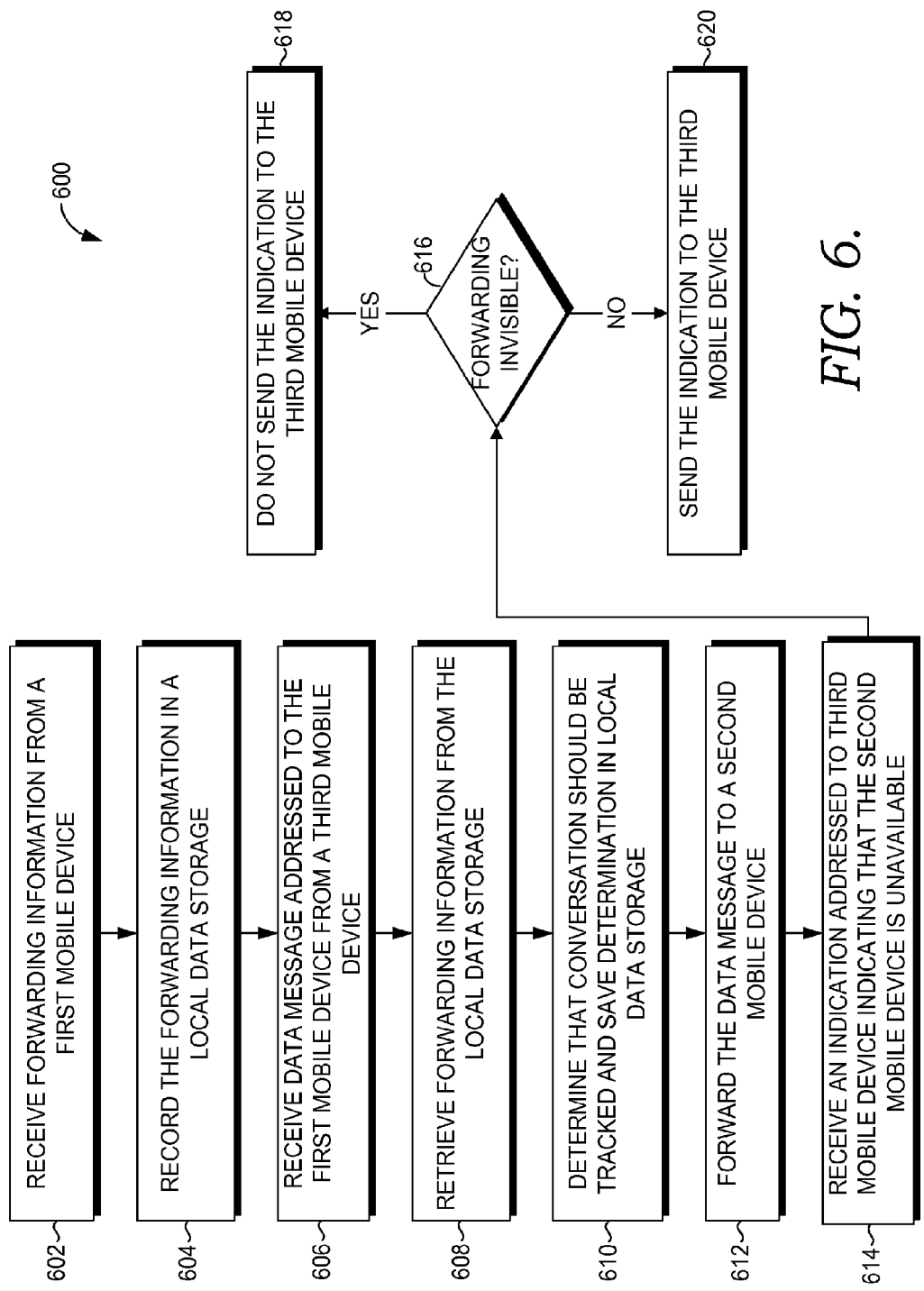
FIG. 6 is a flow chart depicting a method for forwarding a data message originally addressed to first mobile device to a second mobile device in a wireless telecommunications network to be executed on a data message router.

FIG. 6 is a flow chart depicting a method 600, executed on a data message router, for forwarding a data message originally addressed to first mobile device to a second mobile device in a wireless telecommunications network. The method 600 is performed by the data message router described in previous figures and gives a more detailed process for handling data messages whose forwarding is to be kept invisible from the data message sender. In block 602, the data message router receives forwarding information from a first mobile device that in addition to the forwarding number includes an indication that the invisible feature should be enabled. The data router then stores this information in its local data storage component (604).

When the data message router receives a data message addressed to the first mobile device (606), it retrieves the forwarding information, which includes the indications that the forwarding should remain invisible from the local data storage component (608). The router then determines that the conversation between the data message sender and the second mobile device should be tracked and an indication of this determination is saved the data storage component (610). The router then forwards the data message to the second mobile device using methods discussed previously (612). The router then receives a data message addressed to the original data message sender from the second mobile device that gives an indication that the second mobile device is unavailable (614). The router then references the local data storage component and determines if the invisible feature is enabled (616). If it is enabled, then the indication is not sent to the original data message sender (618). The indication may be discarded or sent to the first mobile device. Returning to decision block 616, if the invisible feature is not enabled, then the indication is sent to the original data message sender (620).

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more nontransitory computer-readable media having embodied thereon computer-useable instructions that, when executed by one or more processing devices, perform a method of forwarding a data message, originally addressed to a first mobile device, to a second mobile device in a wireless telecommunications network, wherein the data message is sent from a third mobile device, the method comprising:

receiving the data message originally addressed to the first mobile device and sent from the third mobile device;

determining that the data message is to be forwarded to the second mobile device, wherein the second mobile device belongs to a different telecommunication carrier than the first mobile device;

determining routing information for sending the data message to the second mobile device, wherein determining the routing information includes referencing a local database that contains routing information;

forwarding the data message to the second mobile device, wherein the forwarding includes sending the data message to an inter-carrier gateway for forwarding to the second mobile device;

determining whether the data message originally addressed to the first mobile device, and forwarded to the second mobile device, should also be sent to the first mobile device in addition to forwarding the data message to the second mobile device; and when a determination is made that the data message should also be sent to the first mobile device, then sending the data message to the first mobile device in addition to forwarding the data message to the second mobile device, wherein the data message sent from the third mobile device is sent to both the second mobile device and the first mobile device.

2. The media of claim 1, wherein the data message is a text message.

3. The media of claim 1, wherein the data message is a picture message.

4. The media of claim 1, wherein the data message is a video message.

5. The media of claim 1, wherein determining that the data message is to be forwarded to the second mobile device is based on forwarding information received from the first mobile device.

6. The media of claim 5, wherein determining that the data message is to be forwarded to the second mobile device includes referencing the local database that includes the forwarding information.

7. The media of claim 6 further comprising:

receiving additional forwarding information from the first mobile device, wherein the additional forwarding information indicates that data messages addressed to the first mobile device are no longer to be forwarded to the second mobile device; and recording the additional forwarding information in the local database.

8. One or more nontransitory computer-readable media having embodied thereon computer-useable instructions that, when executed by a network device, cause the network device to perform a method of forwarding a data message originally addressed to a first mobile device to a second mobile device in a wireless telecommunications network, the method comprising:

receiving a data message from a third mobile device addressed to the first mobile device;

determining that the data message is to be forwarded to the second mobile device, wherein the determining includes referencing a local database;

determining routing information for sending the data message to the second mobile device, wherein the determining includes referencing the local database;

determining that the second mobile device belongs to a different telecommunication carrier than the first mobile device;

forwarding the data message to the second mobile device, wherein the forwarding includes sending the data message to an inter-carrier gateway for forwarding to the second mobile device;

receiving an indication of unavailability associated with the forwarding of the data message to the second mobile device, wherein the indication of unavailability is addressed to the third mobile device, and wherein the indication indicates that the second mobile device is unavailable;

determining that the forwarding is to be invisible to the third mobile device, wherein the forwarding is invisible when the third mobile device is prevented from receiving an indication that the data message has been forwarded;

not forwarding the indication of unavailability to the third mobile device based on the determination that the forwarding is to be invisible, wherein the third mobile device is prevented from knowing that the data message has been forwarded; and wherein the indication of unavailability from the second mobile device addressed to the third mobile device is an auto-reply message.

9. The media of claim 8, wherein the data message is a text message.

10. The media of claim 8, wherein the data message is a picture message.

11. The media of claim 8, wherein the data message is a video message.

12. The media of claim 8, wherein the indication of unavailability from the second mobile device addressed to the third mobile device is an auto-reply message.

13. The media of claim 8, wherein determining that the data message is to be forwarded to the second mobile device is based on forwarding information received from the first mobile device.

14. The media of claim 13, wherein determining that the forwarding is to be invisible to the third mobile device includes referencing a local database that includes the forwarding information.

15. The media of claim 14, wherein determining that the forwarding is to be invisible to the third mobile device includes accessing the local database.

* * * * *